(12) United States Patent
Nelson et al.

(10) Patent No.: US 8,787,935 B2
(45) Date of Patent: *Jul. 22, 2014

(54) LOCATION REQUEST AUTHORIZATION FOR COMMUNICATION DEVICES

(75) Inventors: Rodney Dewaine Nelson, Overland Park, KS (US); Michael P. McMullen, Leawood, KS (US); John R. Schuler, Sarasota, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 534 days.

This patent is subject to a terminal disclaimer.

(21) Appl. No.: 12/566,084

(22) Filed: Sep. 24, 2009

(65) Prior Publication Data

US 2011/0070865 A1   Mar. 24, 2011

(51) Int. Cl.
| | | |
|---|---|---|
| H04W 24/00 | (2009.01) | |
| G06F 7/04 | (2006.01) | |
| G06F 13/00 | (2006.01) | |
| G06F 12/14 | (2006.01) | |

(52) U.S. Cl.
USPC ......... 455/456.2; 455/456.1; 726/21; 726/28; 726/29

(58) Field of Classification Search
USPC .......................... 455/456, 414, 404, 457, 521
See application file for complete search history.

(56) References Cited

U.S. PATENT DOCUMENTS

| 6,442,391 B1 | 8/2002 | Johansson et al. |
|---|---|---|
| 2004/0176104 A1 * | 9/2004 | Arcens ....................... 455/456.3 |
| 2007/0067385 A1 * | 3/2007 | D'Angelo et al. ............ 709/203 |
| 2007/0133763 A1 | 6/2007 | D'Angelo et al. |
| 2007/0149213 A1 | 6/2007 | Lamba et al. |
| 2007/0204039 A1 | 8/2007 | Inamdar |
| 2008/0108324 A1 | 5/2008 | Moshir et al. |

FOREIGN PATENT DOCUMENTS

| WO | WO 03034765 A1 * | 4/2003 |
|---|---|---|
| WO | 2005051033 | 6/2005 |
| WO | WO 2005051033 A1 * | 6/2005 |

OTHER PUBLICATIONS

Fleet Manager GSM Functionality; Version : 64.00 Date : Dec. 19, 2002.*

* cited by examiner

*Primary Examiner* — Dwayne Bost
*Assistant Examiner* — Nalini Mummalaneni (57) ABSTRACT

In a communication system, a wireless communication device receives and processes a text message including a location request code and a communication code. In response to the location request code, the wireless communication device transfers a location query indicating the communication code. An authorization computer system receives the location query and processes the communication code to determine if the location request should be authorized. If the location request should be authorized, the authorization computer system transfers a location authorization. The wireless communication device processes the location authorization, and in response, transfers geographic location information using the communication code to control delivery of the geographic location information to a location receiving system.

18 Claims, 6 Drawing Sheets

LOCATION REQUEST AUTHORIZATION FOR COMMUNICATION DEVICES

TECHNICAL BACKGROUND

A wireless communication network can provide the location of a wireless communication device to a third party upon request. The third party requests the location of the wireless communication device from a network gateway. The network gateway authorizes the location request and then sends a text message to the wireless communication device. The text message instructs the wireless communication device to obtain its geographic location from a position determining engine. The wireless communication device obtains and reports its geographic location to the network gateway over an internet protocol (IP) connection. The network gateway then transfers the geographic location of the wireless communication device to the third party.

OVERVIEW

In a communication system, a wireless communication device receives and processes a text message including a location request code and a communication code. In response to the location request code, the wireless communication device transfers a location query indicating the communication code. An authorization computer system receives the location query and processes the communication code to determine if the location request should be authorized. If the location request should be authorized, the authorization computer system transfers a location authorization. The wireless communication device processes the location authorization, and in response, transfers geographic location information using the communication code to control delivery of the geographic location information to a location receiving system.

DETAILED DESCRIPTION

Figure 1:
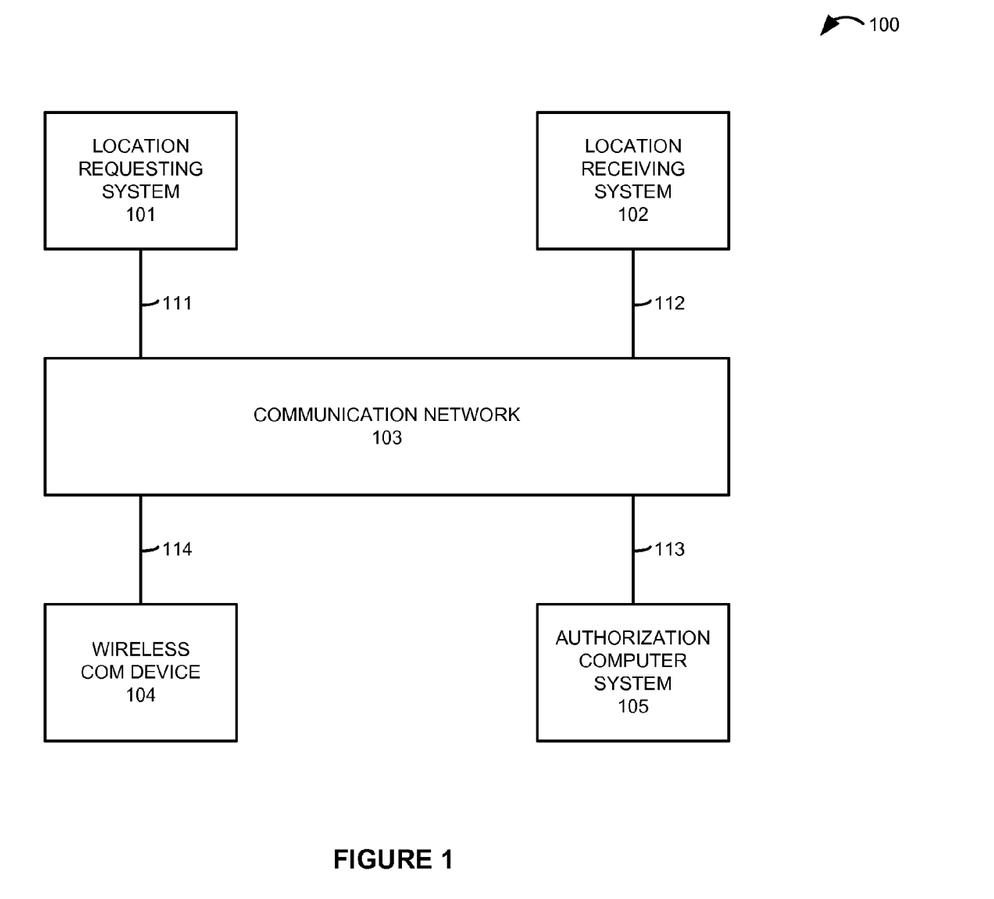
FIG. 1 illustrates a communication system that authorizes location information delivery in response to a text message location request.

FIG. 1 illustrates communication system 100. Communication system 100 comprises location requesting system 101, location receiving system 102, communication network 103, wireless communication device 104, and authorization computer system 105. Wireless communication device 104 is capable of determining or obtaining its geographical location—possibly by latitude/longitude. For example, wireless communication device 104 may include Global Positioning Satellite components or may be able to access a positioning determining computer system in communication network 103.

Location requesting system 101 and communication network 103 communicate over communication link 111. Location receiving system 102 and communication network 103 communicate over communication link 112. Authorization computer system 105 and communication network 103 communicate over communication link 113. Wireless communication device 104 and communication network 103 communicate over wireless communication link 114. Communication links 111-114 could be direct connections or may include various intermediate networks, systems, and devices. Although not required, location requesting system 101 and location receiving system 102 may be integrated together in some examples.

Figure 2:
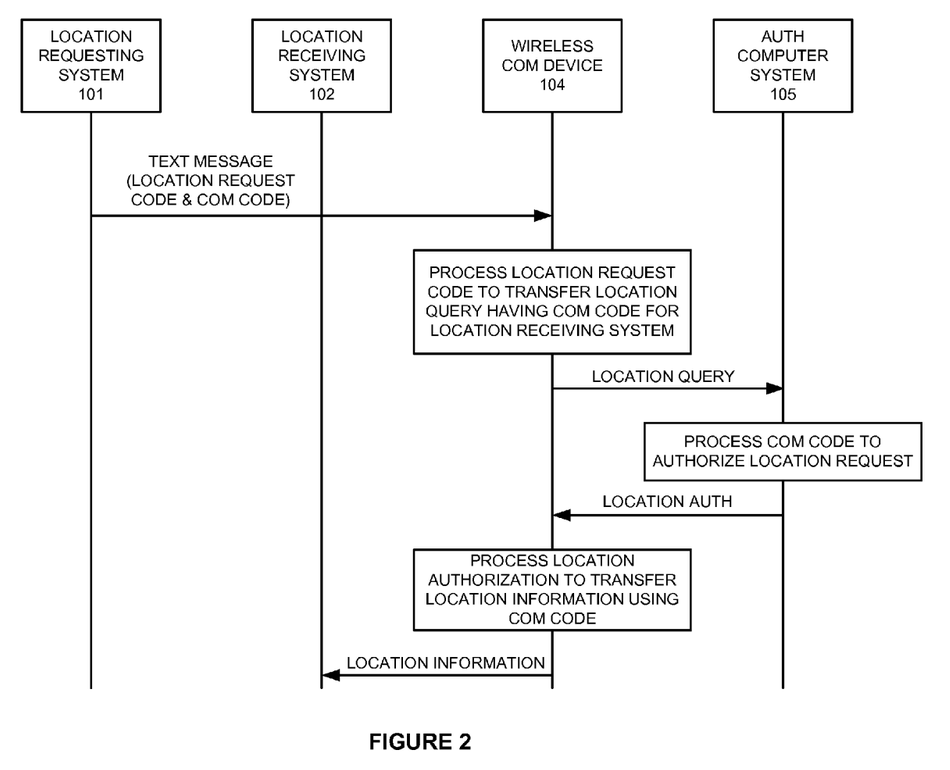
FIG. 2 illustrates the operation of the communication system to authorize location information delivery in response to the text message location request.

FIG. 2 illustrates the operation of communication system 100. Although the following communications typically occur over communication network 103, communication network 103 is not shown on FIG. 2 for clarity. Location requesting system 101 transfers a text message to wireless communication device 104 requesting that wireless communication device 104 send its location to location receiving system 102. The text message could be a Short Message Service (SMS) message or some other text-based datagram. The text message includes a location request code and a communication code for location receiving system 102. The communication code could be a text message destination number, internet protocol address, uniform resource locator, email address, or some other code that controls the destination of a communication message.

Wireless communication device 104 receives the text message and processes the location request code to determine that the text message is a location request that should be authorized. In response to the location request code, wireless communication device 104 transfers a location query to authorization computer system 105. The location query includes the communication code for location receiving system 102, and possibly includes other information. Authorization computer system 105 receives the location query and processes the communication code to authorize the location request. For example, authorization computer system 105 may enter an authorization database with the communication code to determine if the communication code is authorized.

Although not required, the authorization process may also analyze other information to authorize the location request. For example, authorization computer system 105 may process an identifier for wireless communication device 104 or a source number from the text message to authorize the location request. Authorization computer system 105 may process a user name and password (or encrypted password) from the text message to authorize the location request. This processing may use a database as described above to determine if the identifier and/or source number is associated with an authorized communication code.

If the location request is authorized, authorization computer system 105 transfers a location authorization to wireless communication device 104. The location authorization may include additional information, such as location instructions for providing the location information. For example, the location authorization may indicate a time period or frequency when the location information should be provided by wireless communication device 104. Wireless communication device 104 receives the location authorization, and in response, transfers its location information to location receiving system 102 using the communication code. Note that the communication code controls this transfer, so that the location information for wireless communication device 104 is transferred only to location receiving system 102. Thus, authorization computer system 105 effectively authorizes the destination of the location information while allowing a convenient text message to request the location.

Figure 3:
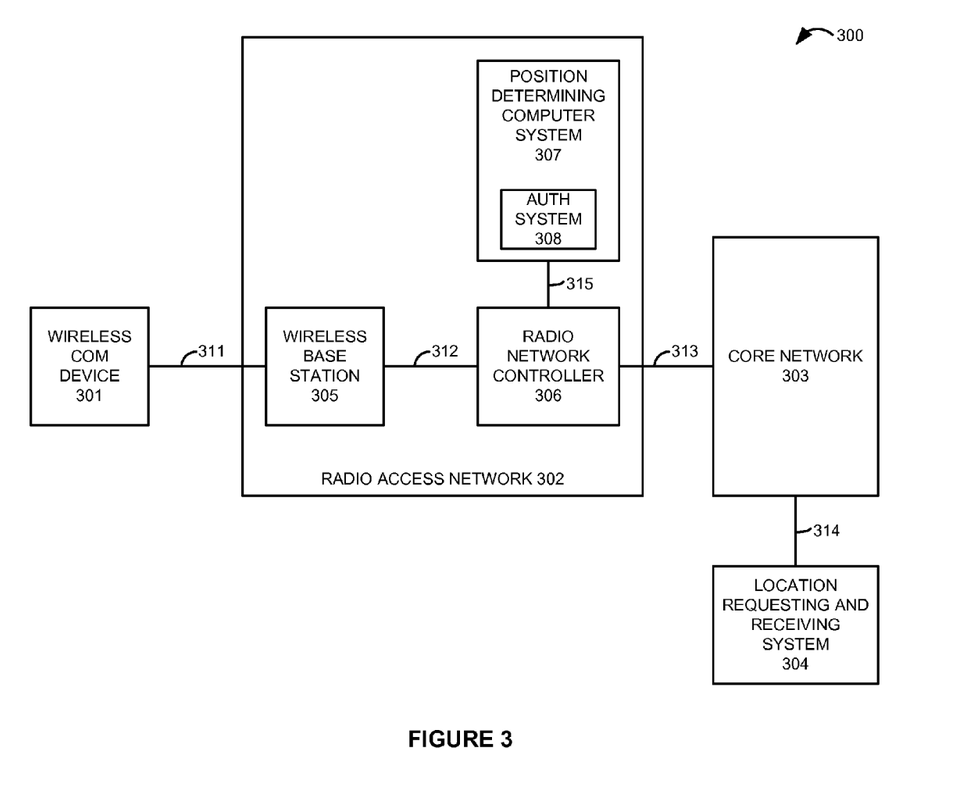
FIG. 3 illustrates a communication system that authorizes location information delivery in response to a text message location request.

FIG. 3 illustrates communication system 300. Communication system 300 is an example of communication system 100, although communication system 100 may use alternative configurations. Communication system 300 comprises wireless communication device 301, radio access network 302, core network 303, and location requesting/receiving system 304. Radio access network 302 comprises wireless base station 305, radio network controller 306, and position determining computer system 307. Position determining computer system 307 includes authorization system 308. In this example, location requesting/receiving system 304 is a commercial business that is a separate business entity from radio access network 302 and core network 303.

Wireless communication device 301 and wireless base station 305 communicate over wireless communication link 311. Wireless base station 305 and radio network controller 306 communicate over backhaul communication link 312. Radio network controller 306 and core network 303 communicate over network communication link 313. Core network 303 and location requesting/receiving system 304 communicate over access communication link 314. Radio network controller 306 and position determining computer system 307 communicate over data communication link 315.

Figure 4:
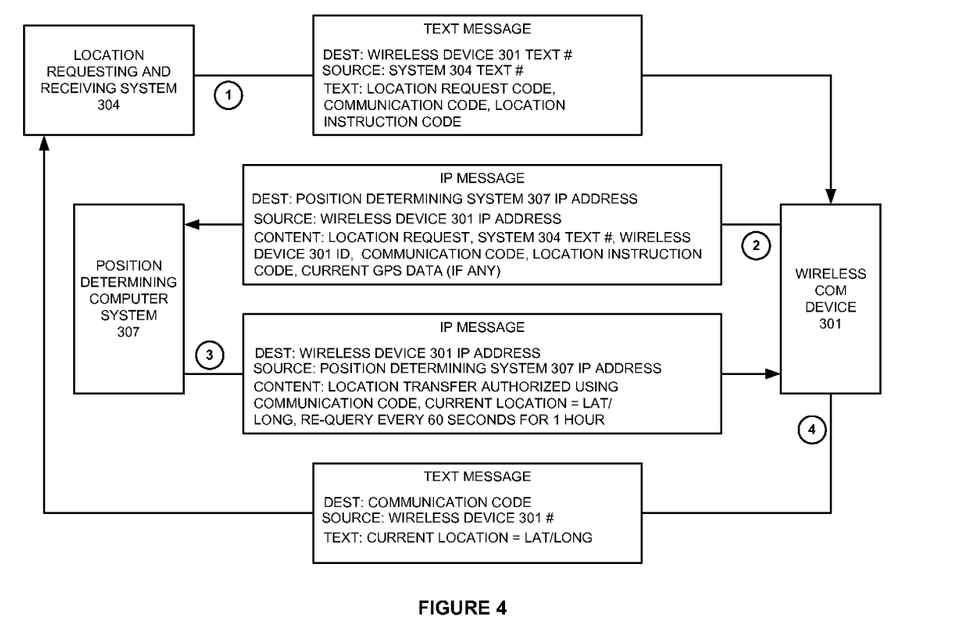
FIG. 4 illustrates the operation of the communication system to authorize location information delivery in response to the text message location request.

FIG. 4 illustrates the operation of communication system 300. Location requesting/receiving system 304 transfers a text message to wireless communication device 301. The text message is directed to the text message number for wireless communication device 301. The text message is transmitted from the text message number for requesting/receiving system 304. The text message includes a location request code, a communication code for system 304, and a location instruction code.

The location request code is a data sequence that is automatically recognized and acted upon by wireless communication device 301. Wireless communication device 301 recognizes the location request code and automatically initiates the following location authorization and transfer process (which may include a user prompt and approval).

The communication code comprises a text message number for requesting/receiving system 304, although other types of codes could be used. In some examples, the communication code could be the source text number for requesting/receiving system 304 that was received in the initial text message from system 304

The location instruction code is a data sequence that is automatically recognized and acted upon by authorization system 308. In this example, the data sequence correlates to a request for location information every minute for one hour, although other location instructions could be used.

In response to the location request code, wireless communication device 301 transfers an IP message addressed to position determining computer system 307. The IP message is from the IP address of wireless communication device 301. The IP message indicates: the location request, system 304 text number, an identifier for wireless communication device 301, the communication code, the location instruction code, and current GPS data for wireless communication device 301—if any GPS data is available.

In position determining computer system 307, authorization system 308 processes the system 304 text number, wireless device 301 identifier, and the communication code to determine if the location request using the communication code should be authorized. For example, authorization system 308 may process the wireless device 301 identifier to determine if the user of device 301 allows automatic location authorization and delivery. If so, authorization system 308 processes the system 304 text number to obtain authorized codes for that text number. Authorization system 308 then compares the communication code to the authorized codes for a match. If a match is found, then the location request is authorized, but the location request is denied if there is no match. If the communication code is not authorized, then authorization system 308 instructs wireless communication device 301 to ignore the location request (not shown).

Authorization system 308 processes the location instruction code to determine an instruction for the location information transfer. The instruction could be a an authorization time period (time-to-live), location delivery frequency, authorized geographic boundary, or some other instruction. In this example, the instruction is a request for location information every minute for one hour. A database that correlates location instruction codes to location instructions could be used for this purpose. The database may also correlate the system 304 text number, or the wireless device 301 identifier to location instructions. For example, the system 304 text number may correlate to the request for location information every minute for one hour, and the wireless device 301 identifier may correlate to an instruction to only provide location information between 8 AM and 5 PM.

If the communication code is authorized, authorization system 308 transfers the GPS data (if any) to the positioning system within position determining computer system 307 for location resolution. The positioning system may use GPS, radio triangulation, sector location, or some other technique for determining the location of wireless communication device 301—including combinations thereof. This positioning system returns latitude/longitude for wireless communication device 301 to authorization system 308.

Authorization system 308 transfers an IP message from its IP address to the IP address of wireless communication device 301. The IP message includes an authorization for transferring location information using the communication code, the latitude/longitude of wireless device 301, and an instruction to re-query and transfer location information every minute for one hour. The one-hour time period is effectively a time-to-live for the authorization, and another location request and authorization would then be required. Wireless communication device 301 receives the IP message, and in response, transfers a text message using the communication code—a destination text message number for location requesting/receiving system 304. The text message is from the text number for wireless communication device 301 and includes the latitude/longitude for wireless communication device 301. Wireless communication device 301 would then continue to obtain and transfer its location using the communication code every minute for one hour without the need for additional authorization during that time period.

Note some alternative operations to the above description for communication system 300. Wireless communication device 301 could be configured to recognize and implement the location instruction code instead of authorization system 308. For example, wireless communication device 301 could recognize the location instruction code and provide its location every minute for one hour.

In another alternative, wireless communication device 301 could determine its own geographic location, and except for authorization system 308, wireless communication device 301 could forgo the use of position determining computer system 307.

Figure 5:
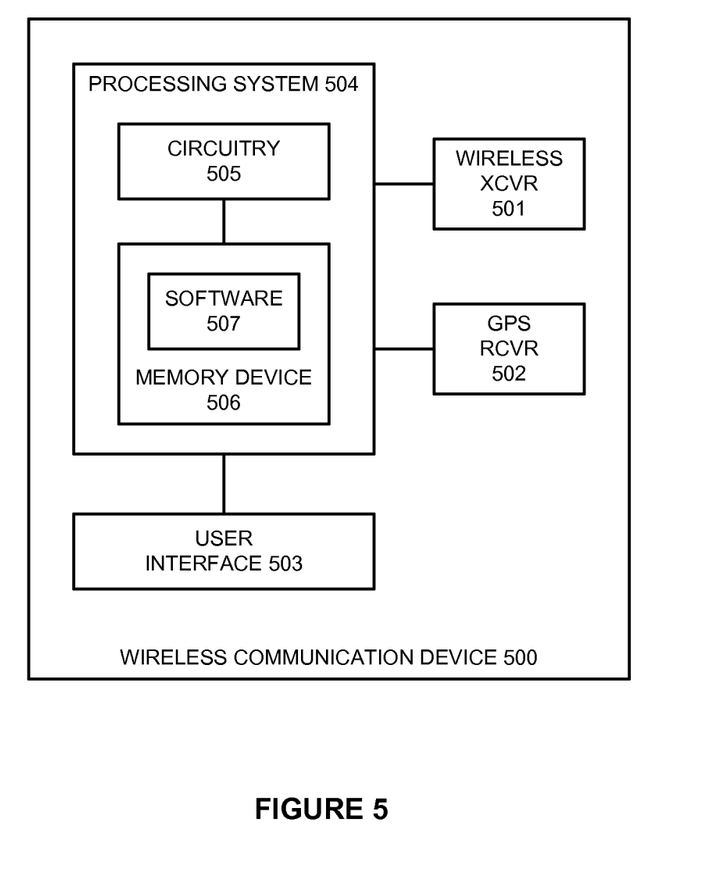
FIG. 5 illustrates a wireless communication device to support location information delivery in response to a text message location request.

FIG. 5 illustrates wireless communication device 500. Wireless communication device 500 is an example of wireless communication devices 104 or 301, although devices 104 or 301 may use alternative configurations. Wireless communication device 500 comprises wireless transceiver 501, GPS receiver 502, user interface 503, and processing system 504. Processing system 504 comprises processing circuitry 505 and memory device 506 that stores operating software 507. Processing system 504 is linked to wireless transceivers 501, GPS receiver 502, and user interface 503. Wireless communication device 500 may include other well-known components that are not shown for clarity, such as a battery, camera, and enclosure.

Wireless transceiver 501 comprises an antenna, RF transceiver, signal processing circuitry, software, and/or some other wireless communication components. Wireless transceiver 501 may use various protocols, such as Code Division Multiple Access (CDMA), Global System for Mobile Communication (GSM), Evolution Data Only (EVDO), Worldwide Interoperability for Microwave Access (WIMAX), Long Term Evolution (LTE), or some other wireless communication format. Wireless transceiver 501 exchanges text messages and IP messages to support location authorization and delivery as described herein.

GPS receiver 502 comprises an antenna, satellite receiver, signal processing circuitry, software, and/or some other satellite communication components. GPS receiver 502 receives and processes GPS signals from GPS satellites to produce geographic coordinates that specify the current geographic location of wireless communication device 500.

User interface 503 comprises components that interact with a user, such as buttons, lights, display, touch screen, microphone, or some other user input/output apparatus—including combinations thereof. User interface 503 may indicate the status or request approval of the location authorization and delivery as described herein.

Processing circuitry 504 comprises microprocessor and other circuitry that retrieves and executes operating software 507 from memory device 506. Memory device 506 comprises a computer-readable storage medium, such as a disk drive, flash drive, data storage circuitry, or some other memory apparatus. Processing circuitry 505 is typically mounted on a circuit board that may also hold memory device 506 and portions of components 501-503.

Operating software 507 comprises computer programs, firmware, or some other form of computer-readable processing instructions. Operating software 507 may include an operating system, utilities, drivers, network interfaces, applications, or some other type of software. When executed by processing circuitry 505, operating software 507 directs processing system 504 to operate wireless communication device 500 to automatically authorize and deliver location information as described herein for wireless communication devices 104 and 301.

Figure 6:
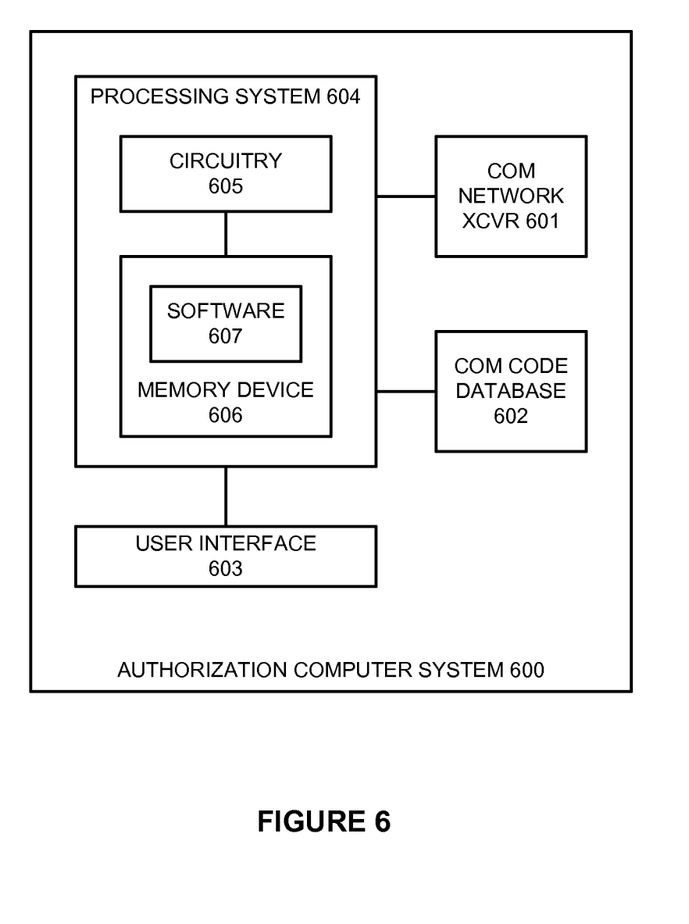
FIG. 6 illustrates an authorization computer system to support location information delivery in response to a text message location request.

FIG. 6 illustrates authorization computer system 600. Authorization computer system 600 is an example of authorization computer systems 105 and 308, although these systems may use alternative configurations. Authorization computer system 600 could be a discrete system or could be integrated onto another system. Authorization computer system 600 comprises communication network transceiver 601, communication code database 602, user interface 603, and processing system 604. Processing system 604 comprises processing circuitry 605 and memory device 606 that stores operating software 607. Processing system 604 is linked to transceiver 601, database 602, and user interface 603. Authorization computer system 600 may include other well-known components that are not shown for clarity, such as enclosures and power systems.

Communication network transceiver 601 comprises a physical communication port, signal processing circuitry, software, and/or some other communication components. Communication network transceiver 601 may use various protocols, such as time division multiplex, Ethernet, wireless, or some other data communication format. Communication network transceiver 601 is equipped to exchange IP and/or text messaging with wireless communication devices over a communication network as described herein.

Communication code database 602 comprises processing circuitry and a computer-readable storage medium that stores software and data. Communication code database 602 maintains a list of authorized communication codes—possibly also correlating authorized communication codes to wireless device identifiers and source text message numbers. Communication code database 602 may also correlate location instruction codes, wireless device identifiers, and/or source text message numbers with location instructions. In alternative configurations, communication code database 602 is located externally to authorization computer system 600.

Processing circuitry 605 comprises microprocessor and other circuitry that retrieves and executes operating software 607 from memory device 606. Memory device 606 comprises a computer-readable storage medium, such as a disk drive, flash drive, data storage circuitry, or some other memory apparatus. Processing circuitry 605 is typically mounted on a circuit board that may also hold memory device 606 and portions of components 601-603.

Operating software 607 comprises computer programs, firmware, or some other form of computer-readable processing instructions. Operating software 607 may include an operating system, utilities, drivers, network interfaces, applications, or some other type of software. When executed by processing circuitry 605, operating software 607 directs processing system 604 to operate authorization computer system 600 to authorize location information transfers as described herein for authorization systems 105 and 308.

Referring back to FIG. 1, location requesting system 101 comprises a computer system, telephone, digital assistant, or some other system with a text message communication interface. Location receiving system 102 comprises a computer system, telephone, digital assistant, or some other system with a text message, IP, or some other communication interface. Communication network 103 comprises antennas and RF communication circuitry for wireless communication. The RF communication circuitry typically includes an amplifier, filter, RF modulator, and signal processing circuitry. Communication network 103 also comprises communication equipment and communication links. The equipment may include call processors, routers, servers, switches, memory devices, software, processing circuitry, cabling, power supplies, communication interfaces, and other communication apparatus—including combinations thereof. Communication network 103 may be a discrete network or may be comprised of multiple networks. Wireless communication device 104 comprises an antenna and RF communication circuitry for wireless communication. The RF communication circuitry typically includes an amplifier, filter, RF modulator, and signal processing circuitry. Wireless communication device 104 also comprises processing circuitry, memory, software, and a user interface.

Communication links 111-113 use metal, glass, air, space, or some other material as the transport media. Communication links 111-113 could use various communication protocols, such as Time Division Multiplex (TDM), Internet Protocol (IP), Ethernet, Code Division Multiple Access (CDMA), Global System for Mobile Communication (GSM), Evolution Data Only (EVDO), Worldwide Interoperability for Microwave Access (WIMAX), Long Term Evolution (LTE), or some other communication format—including combinations thereof. Communication links 111-113 could be direct links or may include intermediate networks, systems, or devices. Wireless link 114 uses the air or space as the transport media. Wireless link 104 may use various protocols, such as Code Division Multiple Access (CDMA), Global System for Mobile Communication (GSM), Evolution Data Only (EVDO), Worldwide Interoperability for Microwave Access (WIMAX), Long Term Evolution (LTE), or some other wireless communication format. Wireless link 114 could be a direct link or may include intermediate networks, systems, or devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system comprising:
    in a wireless communication device, receiving and processing a text message transferred by a location requesting system that includes a location request code and a communication code comprising a text message number assigned to a location receiving system, and in response to the location request code, transferring a location query comprising a first Internet Protocol (IP) message indicating the communication code for delivery to an authorization computer system;
    in the authorization computer system, receiving the location query and processing at least the text message number against authorized text message numbers to determine if the location query should be authorized, and transferring a location authorization comprising a second IP message for delivery to the wireless communication device if the location query should be authorized; and
    in the wireless communication device, receiving and processing the location authorization, and in response, transferring geographic location information for the wireless communication device using the text message number for the location receiving system.

2. The method of claim 1 wherein the communication code for the location receiving system further comprises a uniform resource locator for the location receiving system.

3. The method of claim 1 wherein the communication code for the location receiving system further comprises an internet protocol address for the location receiving system.

4. The method of claim 1 wherein the text message and the location query indicate a text message source number for the text message and further comprising, in the authorization computer system, processing the text message source number to determine if the location query should be authorized.

5. The method of claim 4 further comprising, in the authorization computer system, processing the text message source number to determine location instructions, wherein the location authorization includes the location instructions, and wherein transferring the geographic location information from the wireless communication device comprises transferring the geographic location information based on the location instructions.

6. The method of claim 4 wherein processing the communication code and the text message source number comprises processing the text message source number to obtain at least one authorized code and comparing the communication code to at least one authorized code to determine if the location query should be authorized.

7. The method of claim 1 wherein the text message and the location query indicate a location instruction code and further comprising, in the authorization computer system, processing the location instruction code to determine location instructions, wherein the location authorization includes the location instructions, and wherein transferring the geographic location information from the wireless communication device comprises transferring the geographic location information based on the location instructions.

8. The method of claim 1 wherein the location query includes an identifier for the wireless communication device, and further comprising in the authorization computer system, processing the identifier for the wireless communication device to determine if the location query should be authorized.

9. The method of claim 8 further comprising processing the identifier for the wireless communication device to determine location instructions, wherein the location authorization includes the location instructions, and wherein transferring the geographic location information from the wireless communication device comprises transferring the geographic location information based on the location instructions.

10. A communication system comprising:
    a wireless communication device that receives and processes a text message transferred by a location requesting system that includes a location request code and a communication code comprising a text message number assigned to a location receiving system, and in response to the location request code, transfers a location query comprising a first Internet Protocol (IP) message indicating the communication code;
    an authorization computer system that receives the location query and processes at least the text message number against authorized text message numbers to determine if the location query should be authorized, and transfers a location authorization comprising a second IP message for delivery to the wireless communication device if the location query should be authorized; and
    the wireless communication device that receives and processes the location authorization, and in response, transfers geographic location information for the wireless communication device using the text message number for the location receiving system.

11. The communication system of claim 10 wherein the communication code for the location receiving system further comprises a uniform resource locator for the location receiving system.

12. The communication system of claim 10 wherein the communication code for the location receiving system further comprises an internet protocol address for the location receiving system.

13. The communication system of claim 10 wherein the text message includes a text message source number and:
    the wireless communication device is configured to transfer the text message source number in the location query; and the authorization computer system is configured to process the text message source number to determine if the location query should be authorized.

14. The communication system of claim 13 wherein:

the authorization computer system is configured to process the text message source number to determine location instructions and transfer the location instructions in the location authorization; and the wireless communication device is configured to transfer the geographic location information based on the location instructions.

15. The communication system of claim 13 wherein the authorization computer system is configured to process the text message source number to obtain at least one authorized code for the text message source number and compare the communication code to at least one authorized code to determine if the location query should be authorized.

16. The communication system of claim 10 wherein the text message includes a location instruction code and:

the wireless communication device is configured to transfer the location instruction code in the location query;

the authorization computer system is configured to process the location instruction code to determine location instructions and transfer the location instructions in the location authorization; and the wireless communication device is configured to transfer the geographic location information based on the location instructions.

17. The communication system of claim 10 wherein:

the wireless communication device is configured to transfer an identifier for the wireless communication device in the location query; and the authorization computer system is configured to process the identifier for the wireless communication device to determine if the location query should be authorized.

18. The communication system of claim 17 wherein:

the authorization computer system is configured to process the identifier for the wireless communication device to determine location instructions and transfer the location instructions in the location authorization; and the wireless communication device is configured to transfer the geographic location information based on the location instructions.

\* \* \* \* \*